July 14, 1953 T. L. FAWICK 2,645,501
SHAFT ASSEMBLY, INCLUDING HANDLE-GRIP
AND HAND-LOOP STRAP
Filed March 3, 1949
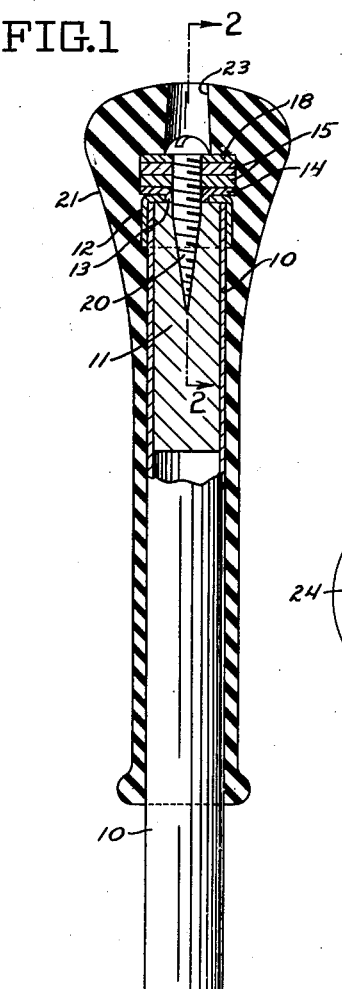
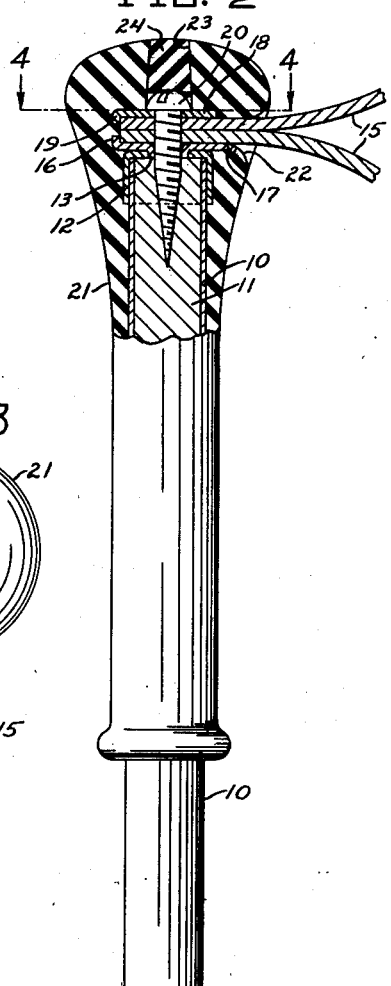
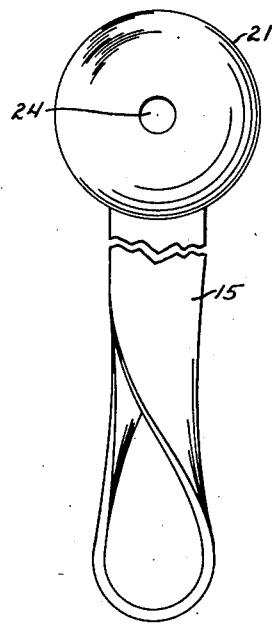
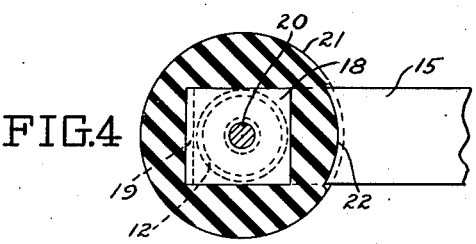
INVENTOR.
THOMAS L. FAWICK
BY Willard D. Eakin
Attorney Patented July 14, 1953

2,645,501

UNITED STATES PATENT OFFICE 2,645,501

SHAFT ASSEMBLY, INCLUDING HANDLE-GRIP AND HAND-LOOP STRAP

Thomas L. Fawick, Cleveland, Ohio, assignor to Fawick Flexi-Grip Company, a corporation of Ohio Application March 3, 1949, Serial No. 79,423

1 Claim. (Cl. 280—11.37)

This invention relates to handle-grip assemblies for ski-poles and the like in which a looped strap is associated with the grip.

Its chief objects are to provide a hand-grip assembly having the advantages of strength, durability, neatness, and economy of construction and repair.

Of the accompanying drawings:

Fig. 1 is an elevation, partly in section, of the handle portion of a ski-pole having mounted thereon a hand-grip assembly embodying my invention in its preferred form.

Fig. 2 is a similar view of the same but sectioned at right-angles to the section plane of Fig. 1.

Fig. 3 is a top end view of the assembly.

Fig. 4 is a section on line 4—4 of Fig. 2.

The ski-pole is here shown as comprising a tubular metal shaft 10 having a wooden plug 11 driven to a flush position in the upper end of it and thus becoming a part of the shaft.

Fitted onto the upper end of the shaft 10 is a cup-shaped metal stamping 12 having a central hole, into which is fitted an annular flange or boss 13 formed on a metal stamping 14 which lies upon the cup-shaped stamping 12. The stamping 14 is of generally rectangular shape, with a width slightly greater than that of a looped strap 15 the two end portions of which overlie it, and preferably this stamping 14 is formed with an upturned stop flange 16 at one of its ends and is curved slightly downward, as shown at 17, at its other end.

Overlying the strap ends is another metal stamping, 18, having a central hole and having a downwardly bent stop flange 19 aligned with the flange 16 of the stamping 14.

The parts thus far described are held in assembled relation by a wood-screw 20 as shown, extending through the stampings and the strap ends and screwed into the wooden plug 11.

A suitably shaped hand grip 21 of natural or synthetic rubber substantially encloses the shaft-end and strap-end assembly and preferably has mold-vulcanized adhesion to all of the metal parts described. The grip 21 is formed with a molded recess for admitting the strap-ends, through its flared mouth 22, and for accommodating them, with a snug but sliding fit, in the positions in which they are shown. The grip 21 is formed also with an axial hole 23 extending from the center of its upper end face to the strap-receiving recess, to permit the mounting of the screw 20. This hole 23 preferably is upwardly tapered, as shown, so that it will firmly retain, with or without an adhesive, a rubber or other filler plug 24 mounted in it to hide the head of the screw and to provide a smooth upper surface for the head of the grip.

The plug 24 can be of a color contrasting with that of the grip, for ornamental effect, or it can be marked with identifying or other indicia.

Preferably all of the parts described except the screw 20, the strap 15 and the plug 24 have the rubber grip mold vulcanized upon them as a unit, by molding equipment and procedure well known in the art, after which the three parts just mentioned are put in place.

In case of breakage of the strap 15 a new strap can be readily substituted, by removal of the plug 24 and screw 20, without disturbing the other parts and without difficult removal of strap-fastening means such as rivets, for example.

Because of the deformability of the rubber of the grip, the strap-ends can be firmly clamped between the metal stampings, permissibly roughened for secure gripping, by tightening of the screw, so that the strain need not be taken entirely by the interlock at the screw holes in the strap. The wooden plug 11, the shaft 10, the cup-shaped stamping 12 and the flanged stamping 14 are all strongly interlocked against the pull of the strap.

Modifications are possible within the scope of the invention as defined in the appended claim, in which the word rubber is intended to be inclusive of natural and synthetic substances having substantially the resilient deformability of vulcanized soft-rubber.

I claim:

The combination of a shaft structure, a hand grip which fits upon an end portion thereof, said grip being formed with a strap-receiving hole extending from the end face of said end portion of said shaft structure and opening upon an external side face of the grip and with a fastener-receiving hole extending from said end face of said shaft structure and opening upon the outer end face of the grip, a hand-loop strap removably extending inward through the said strap-receiving hole and removably overlying the said end face of the shaft structure, and strap-fastening means removably extending inward through the said fastener-receiving hole and clamping the said strap against the said end face of the shaft structure.

THOMAS L. FAWICK.

References Cited in the file of this patent

UNITED STATES PATENTS

| Number | Name | Date |
|---|---|---|
| 1,017,565 | Lard | Feb. 13, 1912 |
| 1,139,843 | Brown | May 18, 1915 |

FOREIGN PATENTS

| Number | Country | Date |
|---|---|---|
| 64,165 | Norway | Nov. 17, 1941 |
| 111,379 | Switzerland | Aug. 17, 1925 |
| 558,814 | Germany | Sept. 12, 1932 |